(12) United States Patent
Yi et al.

(10) Patent No.: US 12,289,549 B2
(45) Date of Patent: Apr. 29, 2025

(54) IMAGE SENSOR WITH CHARGE TRANSFER BETWEEN PIXELS

(71) Applicant: Fairchild Imaging, Inc., San Jose, CA (US)

(72) Inventors: Xianmin Yi, Menlo Park, CA (US); Alexander Lu, San Jose, CA (US); Carol Zhao, Milpitas, CA (US)

(73) Assignee: FAIRCHILD IMAGING, INC, San Jose, CA (US)

( * ) Notice: Subject to any disclaimer, the term of this patent is extended or adjusted under 35 U.S.C. 154(b) by 202 days.

(21) Appl. No.: 17/983,693

(22) Filed: Nov. 9, 2022

(65) Prior Publication Data

US 2024/0155262 A1    May 9, 2024

(51) Int. Cl.
*H04N 25/71* (2023.01)
*H04N 25/713* (2023.01)

(52) U.S. Cl.
CPC ................. *H04N 25/713* (2023.01)

(58) Field of Classification Search
CPC .................................................. H04N 25/713
See application file for complete search history.

(56) References Cited

U.S. PATENT DOCUMENTS

| | | |
|---|---|---|
| 7,626,626 B2 | 12/2009 | Panicacci |
| 7,952,629 B2 | 5/2011 | Cieslinski |
| 8,785,831 B2 | 7/2014 | Krymski |
| 9,041,842 B2 | 5/2015 | Willassen |
| 9,210,345 B2 | 12/2015 | Lahav et al. |
| 9,332,200 B1 | 5/2016 | Hseih et al. |
| 9,554,071 B2 | 1/2017 | Panicacci |
| 9,942,502 B2 | 4/2018 | Borremans |

(Continued)

FOREIGN PATENT DOCUMENTS

WO    2022/225948 A1    10/2022

OTHER PUBLICATIONS

Ma et al., A Pump-Gate Jot Device With High Conversion Gain for a Quanta Image Sensor, Jan. 12, 2015 (Jan. 12, 2015); [Retrieved from URL: https://ieeexplore.ieee.org/documen/7006672]; [Retrieved from onllne on Jan. 4, 2023 (Jan. 4, 2023)]; entire document, especially, abstract, FIG. 1,2,4, p. 1, col. 1, para 1, p. 2, col. 1, last para, p. 3, col. 1, para 1, p. 3, col. 2, para 1, p. 4, col. 2, last para.

(Continued)

*Primary Examiner* — Lin Ye
*Assistant Examiner* — Fayez A Bhuiyan
(74) *Attorney, Agent, or Firm* — Panitch Schwarze Belisario & Nadel LLP (57) ABSTRACT

Image sensor systems are disclosed that allow for charge transfer between pixels of a group included in a pixel array with a single digital readout of the accumulated charge from the group. Each of the pixels within a given group includes a photodetector. One or more pump gates are arranged between adjacent pixels of the given group to allow charge to be pumped from one pixel to the next in a serial fashion within the group. A readout circuit that includes at least a transfer gate and a capacitor may be coupled to a final pixel of the group to receive the accumulated charge and generate a photodetector signal (based on the accumulated charge) that can be amplified via a source follower component and ultimately read out to a column amplifier.

20 Claims, 9 Drawing Sheets

(56) References Cited

U.S. PATENT DOCUMENTS

| | | |
|---|---|---|
| 10,192,911 B2 | 1/2019 | Agranov et al. |
| 11,239,267 B2 | 2/2022 | Agranov et al. |
| 2005/0082582 A1* | 4/2005 | Rhodes ............. H01L 27/14643 |
| | | 438/588 |
| 2010/0097508 A1 | 4/2010 | Yanagita et al. |
| 2014/0226047 A1* | 8/2014 | Lahav .................. H04N 25/771 |
| | | 348/296 |
| 2019/0252428 A1 | 8/2019 | Ma et al. |
| 2022/0337774 A1 | 10/2022 | Oh |

OTHER PUBLICATIONS

Velichko et al., Low Noise High Efficiency 3.75 m and 2.8 m Global Shutter CMOS Pixel Arrays, 2013 (2013); [Retrieved from URL: https/www.Imagesensors.org/Past%20Workshops/2013%20Workshop/2013%20Papers/12-1_015-Vellchko_paper.pdf]; [Retrieved from online on Jan. 4, 2023 (Jan. 4, 2023)]; entire document, especially, abstract, FIG. 7, p. 2, 3.

International Search Report, PCT/US23/79085, mailed Mar. 1, 2024, 11 pages.

\* cited by examiner

IMAGE SENSOR WITH CHARGE TRANSFER BETWEEN PIXELS

BACKGROUND

Image sensors are widely used for a number of different applications across a large portion of the electromagnetic spectrum. Many image sensor designs use an array of sensors to capture light across a given area upon which light impinges. Each sensor may be considered a single pixel of the sensor array, with the pixels arranged in any number of rows and columns. Each pixel includes some form of photodetector as well as a circuit to collect the charge from the photodetector in response to an impinging light input. A number of non-trivial issues exist with regard to the design of the pixel array to provide improved performance.

These and other features of the present embodiments will be understood better by reading the following detailed description, taken together with the figures herein described.

DETAILED DESCRIPTION

Image sensor systems are disclosed that allow for charge transfer between pixels of a group included in a pixel array, with a single digital readout of the accumulated charge from the group. The digital readout of an accumulated charge from across multiple pixels confers many benefits, such as a reduced dark current, reduced number of digital reads across the pixel array, and an overall reduced read noise. According to some embodiments, each of the pixels within a given group includes a photodetector. One or more pump gates are arranged between adjacent pixels of the given group to allow charge to be pumped from one pixel to the next in a serial fashion within the group. A readout circuit may be coupled to a final pixel of the group to receive the accumulated charge and generate a photodetector signal (based on the accumulated charge). In an example, the readout circuit includes at least a transfer gate and a capacitor. The resulting photodetector signal can be, for instance, amplified via a source follower component and ultimately read out to a column amplifier, and subjected to further processing and/or use in a given downstream system.

General Overview

As previously noted, there a number of non-trivial issues that remain with respect to designing pixel arrays for an image sensor. For example, accumulating charge between pixels can be helpful to track either moving objects or a moving camera. However, high read noise can result from attempting to read out this charge in the analog domain. Digital reads can be made faster and with less noise, but integration with charge coupled devices (CCD) can be difficult.

Thus, and in accordance with an embodiment of the present disclosure, techniques are disclosed for designing a sensor array having groups of pixels that transfer charge in a serial fashion across the pixels of a given group, and that includes a corresponding digital readout of the accumulated charge from the given group. Such a sensor array may be used to implement time-delay integration for tracking moving objects. The sensor array of pixels may be, for example, any type of charge coupled device (CCD) designed to receive light for the purpose of generating an image from the light received across the sensor array, although other pixel-based imaging arrays may also benefit. According to some embodiments, a group of pixels may be coupled together in a series arrangement with one or more pump gates between adjacent pixels to allow for charge transfer between adjacent pixels. In this way, charge may be continuously pumped from one pixel to the next in a chain (group) until the total accumulated charge from the group is read out from a final pixel in the chain. Any number of pixels may be used within the group (e.g., 2 or more pixels per group). Each pixel may have its own photodetector, while a readout circuit coupled to one of the pixels in the group includes at least a transfer gate to pass the accumulated charge to a sensing node. According to some such example embodiments, the sensing node in the readout circuit is coupled to a capacitor (or a plurality of parallel capacitors based on the state of one or more switches within the readout circuit). The accumulated charge from the group of pixels may be used to generate a current signal that is ultimately fed to a column amplifier or other amplifier element before being converted into a digital signal via an analog-to-digital converter (ADC). Some embodiments may include filtering of the sensor signals and/or resulting current signal, prior to or after amplification.

According to some embodiments, each of the one or more pump gates arranged between adjacent pixels includes at least a charge gate, such as a field effect transistor (FET), and a potential barrier coupled to an output of the charge gate. The inclusion of the potential barrier allows for the charge gate to act as a pump gate to pump charge onto the next pixel in the group. A PN diode is one example of a potential barrier.

According to an example embodiment, a CCD includes a plurality of pixels with each pixel having a photodetector, a plurality of pump gate blocks with each pump gate block being between a corresponding pair of pixels of the plurality of pixels. In one such example, each pump gate block includes a first pump gate coupled in series with a second pump gate, a transfer gate having an input coupled to the photodetector of one pixel of the plurality of pixels, and a capacitor coupled to an output of the transfer gate.

According to another example embodiment, a CCD includes a first pixel comprising a first photodetector, a second pixel comprising a second photodetector, a first pump gate and a second pump gate coupled in series between the first pixel and the second pixel, a transfer gate having an input coupled to the second photodetector of the second pixel, and a capacitor coupled to an output of the transfer gate.

According to another example embodiment, an image sensor includes a pixel array having at least one column of addressable pixels. The at least one column of addressable pixels includes at least a first pixel having a first photodetector and a second pixel having a second photodetector. The image sensor further includes a first pump gate and a second pump gate coupled in series between the first pixel and the second pixel, a readout circuit, a column amplifier coupled to the readout circuit, an analog-to-digital converter (ADC) coupled to the column amplifier, and a processor coupled to the ADC. The readout circuit includes a transfer gate having an input coupled to the second photodetector of the second pixel, and a capacitor coupled to an output of the transfer gate.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

System Architecture

Figure 1:
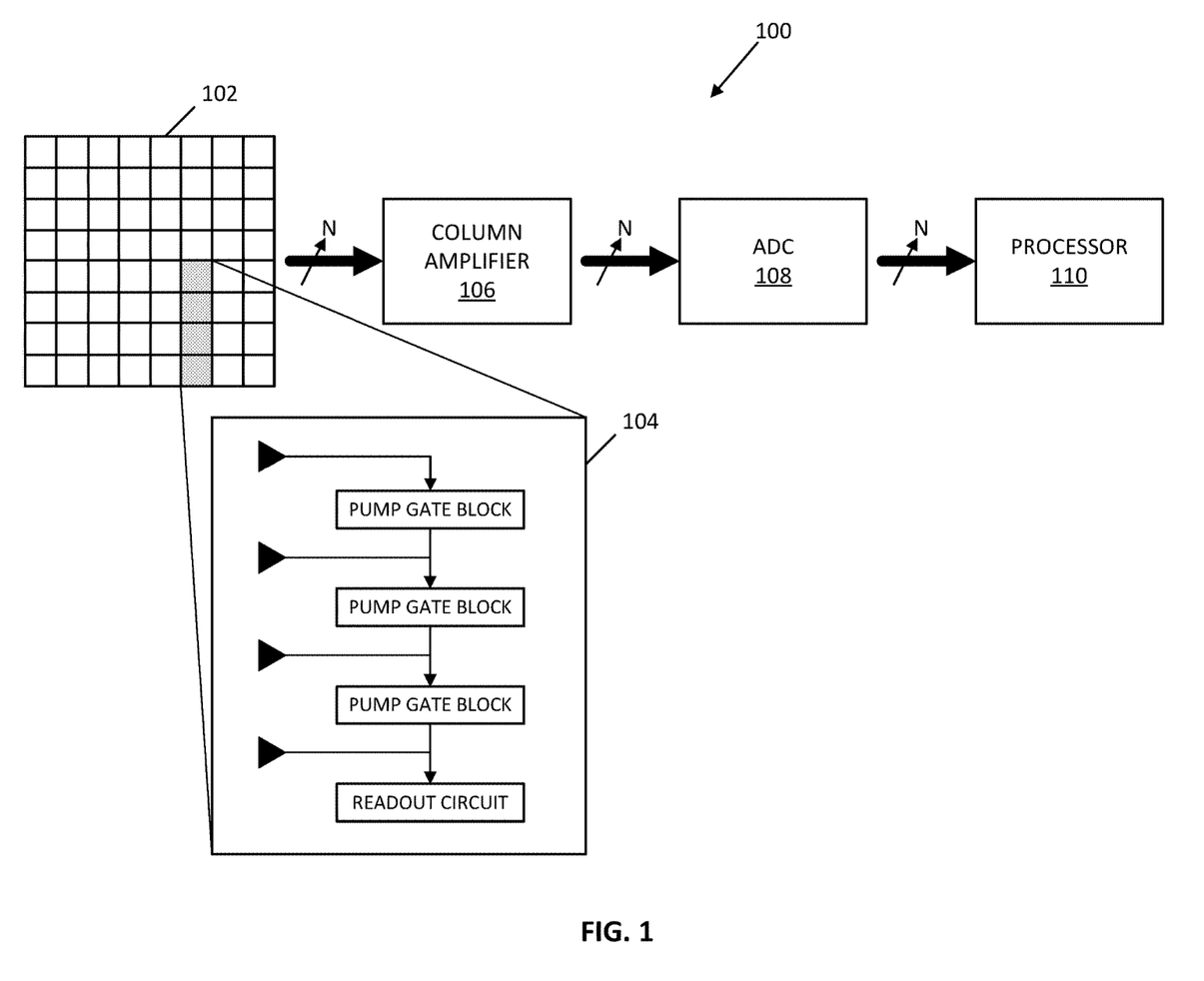
FIG. 1 is a block diagram of an image sensor system that uses a pixel array, in accordance with an embodiment of the present disclosure.

FIG. 1 is a block diagram of an example image sensor 100, according to some embodiments. In some such example embodiments, image sensor 100 may represent or be an integral part of a charge coupled device (CCD) camera or other type of imaging device. In some embodiments, image sensor 100 may be configured for capturing different portions of the electromagnetic spectrum, such as visible light, ultraviolet radiation, infrared radiation, or x-rays, to name a few examples. Image sensor 100 may include a pixel array 102, a column amplifier 106, an ADC 108, and a processor 110. Each of the illustrated components may be included together on same printed circuit board (PCB) or together in a single chip package (e.g., a system-in-package or system-on-chip). In some other embodiments, any one or more of the elements may be provided in a separate chip package and/or on separate PCBs.

According to some embodiments, pixel array 102 includes a plurality of pixels arranged in a row-column format. Each pixel of pixel array 102 may have a similar architecture that includes at least a photodetector. The photo detection area of each pixel on which incident radiation may impinge may vary from one embodiment to the next, but in some example cases has a physical size of around 1 µm×1 µm up to around 5 µm×5 µm. Likewise, the shape and lensing (if present) of the photo detection area (e.g., photo diode) can also vary from one example to the next, depending on factors such as desired fill factor of the array. According to some embodiments, each row of pixels may be coupled together via a common row-select line (e.g., a wordline), to provide separately addressable rows of pixels.

As shown in the blown-out section, a group of pixels 104 within a given column of pixel array 102 may be coupled together via a series of pump gate blocks to transfer charge in a serial manner between the pixels of the group 104, according to some embodiments. In the illustrated example, the outputs of the photodetectors from each of four pixels are coupled together via pump gate blocks with a readout circuit coupled to a last photodetector from a last pixel in the group 104. Other examples may have fewer pixels, and still other examples may have more pixels. In this context, the last pixel may be any pixel directly coupled to the readout circuit or the pixel onto which all of the charge from the pixel group 104 is accumulated. As noted above, any number and arrangement of pixels on pixel array 102 can be grouped together to create a charge transfer chain and to share a common readout circuit. Each of the pump gate blocks includes one or more pump gates as described in more detain herein.

According to some embodiments, the outputs from N different columns of pixels (with each column having any number of pixel groups) are received by column amplifier 106. According to some embodiments, column amplifier 106 represents N separate column amplifiers with a given column amplifier configured to receive the output from a corresponding column of pixels from pixel array 102. In this way, a given row of pixels from pixel array 102 can be selected via a row-select line and simultaneously read out via the N column amplifiers 106. According to some embodiments, column amplifier 106 may include any type of amplifier configuration, such as any number of source follower FETs or operational amplifiers. In some embodiments, a single column amplifier 106 may be used in conjunction with a multiplexer to receive each of the N column outputs from pixel array 102.

According to some embodiments, the output(s) from column amplifier 106 is/are received by ADC 108. As noted above, ADC 108 may represent N different ADCs with a given ADC configured to receive the output from a corresponding column amplifier 106. ADC 108 may be implemented with any suitable ADC technology.

Processor 110 may be configured to receive the digitized signal from ADC 108 (or N digitized signals across N ADCs) and perform any number of operations with the signal(s). For example, processor 110 may receive the signal data from a given row of pixels of pixel array 102 and use the signal data to create an image or a portion of an image captured via pixel array 102. As used herein, the term "processor" may refer to any device or portion of a device that processes electronic data from registers and/or memory to transform that electronic data into other electronic data that may be stored in registers and/or memory. Processor 110 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, custom-built semiconductor, or any other suitable processing devices.

Grouped Pixel Design

Figure 2:
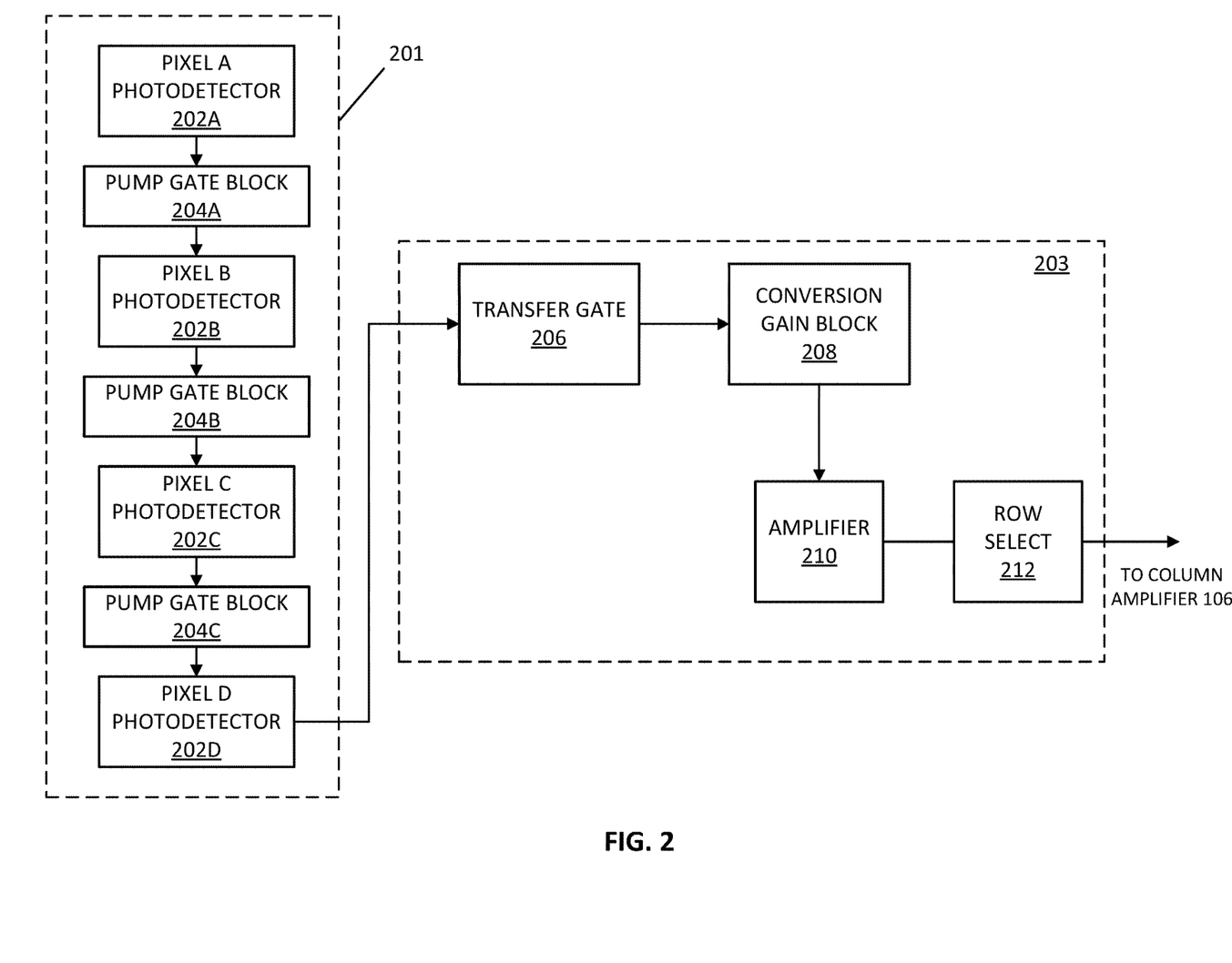
FIG. 2 is a block diagram illustrating the various components of a group of pixels of the pixel array of FIG. 1, in accordance with an embodiment of the present disclosure.

FIG. 2 illustrates a block diagram of a group of pixels 201 from pixel array 102 that includes four pixels coupled in series along with pump gate blocks and a final charge output from one of the pixels to a readout circuit 203, according to some embodiments. As noted above, four pixels A-D are used here as an example, but any number of pixels may be grouped together in the same fashion to form a chain of charge transfer from one pixel to the next. Each of the four pixels includes a photodetector 202A-202D. Photodetector 202A-202D may include any type of photosensitive design, such as a PN diode. Note that the term pixel as used herein may refer to a functional pixel circuit and not just the photo detection area of a given pixel.

According to some embodiments, a first pump gate block 204A is coupled in series between pixel A photodetector 202A and pixel B photodetector 202B, a second pump gate block 204B is coupled in series between pixel B photodetector 202B and pixel C photodetector 202C, and a third pump gate block 204C is coupled in series between pixel C photodetector 202C and pixel D photodetector 202D. There is no pump gate block coupled to the output of pixel D photodetector 202D as the charge on pixel D photodetector 202D may include the accumulated charge transferred from each of pixels A-C, which is then passed on to readout circuit 203. Each pump gate block may have the same configuration, such as two pump gates coupled in series. A given pump gate may include a charge gate coupled in series with a potential barrier as discussed in more detail in the circuit schematics of FIGS. 3A-3C.

According to some embodiments, readout circuit 203 includes a transfer gate 206 coupled to an output of the last pixel in the group 201 (e.g., pixel D). The last pixel of the group 201 may be defined as the pixel that receives transferred charge from each other pixel of the group 201. Transfer gate 206 acts like a gatekeeper to the accumulated charge generated by photodetectors 202A-202D in response to a light input. In some embodiments, transfer gate 206 may include a single field effect transistor (FET), such as a p-doped or n-doped metal oxide semiconductor device (PMOS or NMOS).

Transfer gate 206 is configured to allow the accumulated charge to pass on to conversion gain block 208, where the charge is stored across at least one capacitor, according to some embodiments. As described above, the active area of a given photodetector (e.g., the area which is sensitive to impinging light and generates a corresponding signal based on intensity of that light), as well as any lensing, can vary depending on the given application. In some examples, conversion gain block 208 may include one or more switches and any number of capacitors, where a state of the switches can be used to select a conversion gain mode in which the conversion gain block 208 operates. In such examples, the charge that passes through transfer gate 206 may be stored at a given conversion gain based on which capacitors have been coupled to a sensing node within conversion gain block 208.

According to some embodiments, the sensing node from conversion gain block 208 is further coupled to amplifier 210 to generate an output signal. Amplifier 210 may be implemented, for example, as a single source-follower NMOS or PMOS device, or as an operational amplifier.

According to some embodiments, a row select switch 212 is included within readout circuit 203. Row select switch 212 may have a gate or select input that is coupled to a common row-line (e.g., a wordline) with other pixels (e.g., all other pixels used to readout from respective pixel groups) of the same row. Accordingly, when the current row is activated to read out from, row select switch 212 is activated and turned on to read out the output signal to column amplifier 106. When the current row is not selected, row select switch 212 is not active and no signal is read out to column amplifier 106. Row select switch 212 may be implemented, for example, as an NMOS or PMOS device with the row-line coupled to the gate of the NMOS or PMOS device.

Figure 3A:
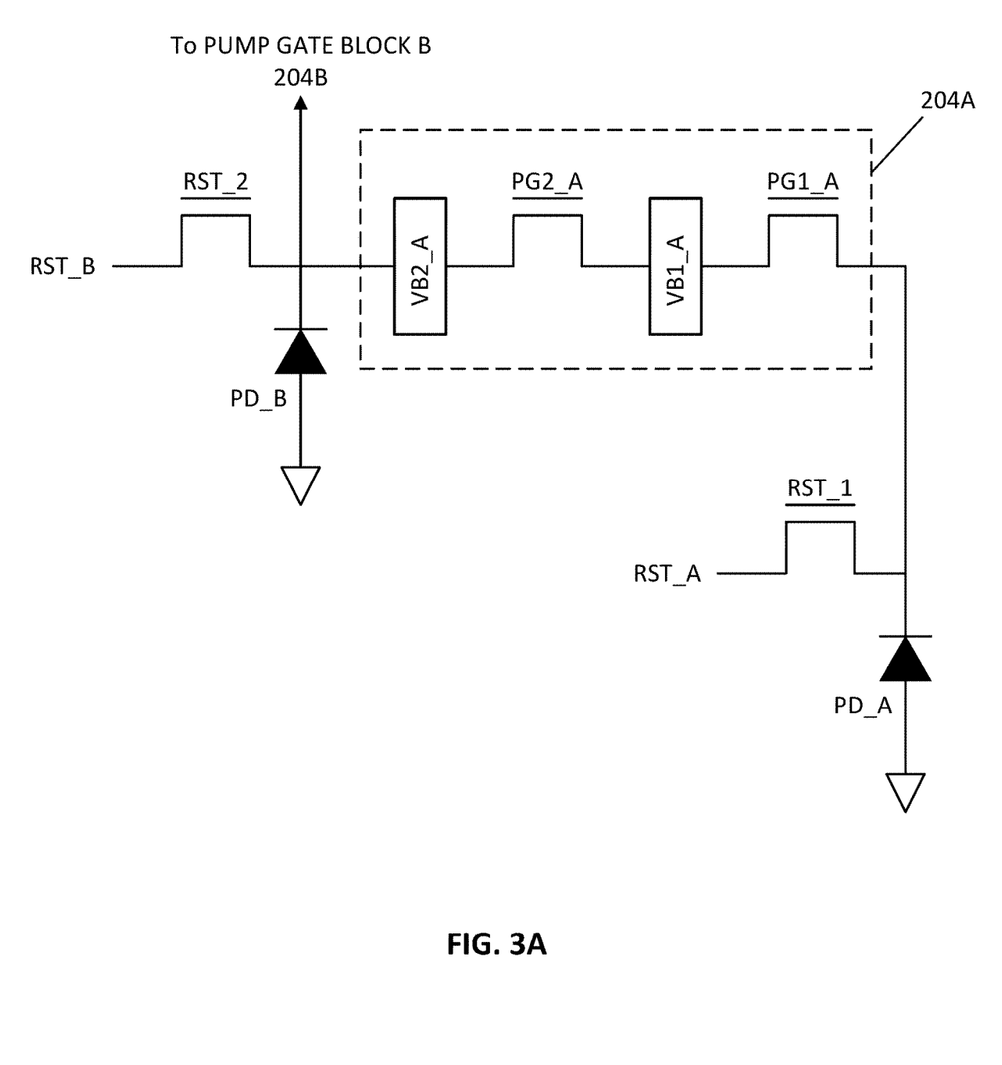
FIG. 3A is a schematic diagram of a first pixel of the group of pixels from FIG. 2, in accordance with an embodiment of the present disclosure.

FIG. 3A illustrates an example circuit schematic of the first two pixels of a pixel group (e.g., pixel A and pixel B), according to some embodiments. Each of the illustrated FETs may be either an NMOS or PMOS device depending on the layout. Additionally, in some embodiments, any of the FETs can be replaced with other transistor architectures, such as a bipolar junction transistor (BJT).

As noted above, pixel A includes a photodetector PD_A and pixel B includes a photodetector PD_B. According to some embodiments, first pump gate block 204A is coupled in series between the two photodetectors. First Pump gate block 204A may include any number of pump gates with two pump gates used in the illustrated example. According to an embodiment, a first pump gate includes a charge gate PG1_A and a potential barrier VB1_A and a second pump gate includes a charge gate PG2_A and a potential barrier VB2_A. Each of the charge gates PG1_A and PG2_A may have substantially the same device size (e.g., W/L ratios) and about the same switching speed, such that their respective W/L ratio and switching speeds are each within a given tolerance (e.g., +/−10%, or +/−5%, or +/−2%) of a target value. According to some embodiments, the pump gates of pump gate block 204A may be used to pump charge from PD_A (via toggling PG1_A off and on) onto PD_B (via turning PG2A off) as discussed in more detail in the timing diagram shown in FIG. 5.

Each of the potential barriers VB1_A and VB2_A may be any element that can store or hold charge. On example of a potential barrier is a reverse biased PN diode. With regards to the circuit schematic, the PN diode may be coupled between a ground potential (or a negative rail potential) and a node between the two charge gates PG1_A and PG2_A.

According to some embodiments, each pixel also includes a reset switch coupled to an output of the pixel's photodetector. In the illustrated example, pixel A incudes a reset switch RST_1 to apply a reset voltage RST_A to photodetector PD_A, and pixel B incudes a reset switch RST_2 to apply a reset voltage RST_B to photodetector PD_B. In some examples, the reset switches may be used to provide anti-blooming capability to avoid light saturation at any of the photodetectors. The reset voltages RST_A and RST_B may be the same voltage (e.g., a rail voltage), or may be different voltages depending on the application.

Figure 3B:
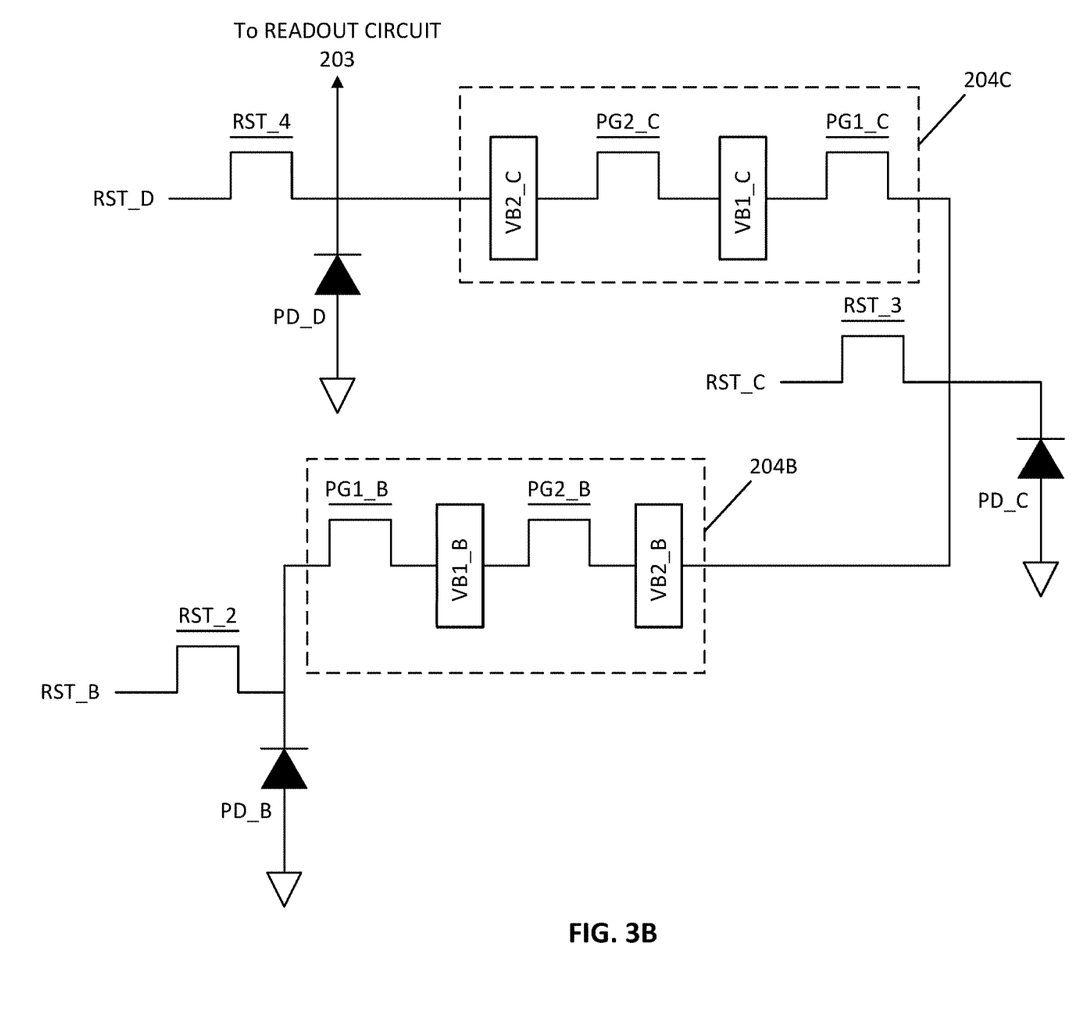
FIG. 3B is a schematic diagram of a subset of the group of pixels from FIG. 2, in accordance with an embodiment of the present disclosure.

FIG. 3B illustrates an example circuit schematic between additional pixels of the pixel group continuing after the schematic of the first two pixels from FIG. 3A, according to some embodiments. As such, additional pump gate blocks are seen coupled in series between each consecutive pixel pair. For example, second pump gate block 204B is coupled in series between photodetector PD_B and photodetector PD_C, and third pump gate block 204C is coupled in series between photodetector PD_C and photodetector PD_D. The configuration and operation of each of second pump gate block 204B and third pump gate block 204C may be similar to that of first pump gate block 204A. Accordingly, second pump gate block 204B facilitates the transfer of charge from photodetector PD_B to photodetector PD_C and third pump gate block 204C facilitates the transfer of charge from photodetector PD_C to photodetector PD_D. As noted above, each other pixel in the group includes its own reset switch, such as a third reset switch RST_3 coupled to photodetector PD_C and a fourth reset switch RST_4 coupled to photodetector PD_D. Any of the reset voltages RST_A, RST_B, RST_C, or RST_D may be the same voltage (e.g., a rail voltage), or may be different voltages depending on the application.

Figure 3C:
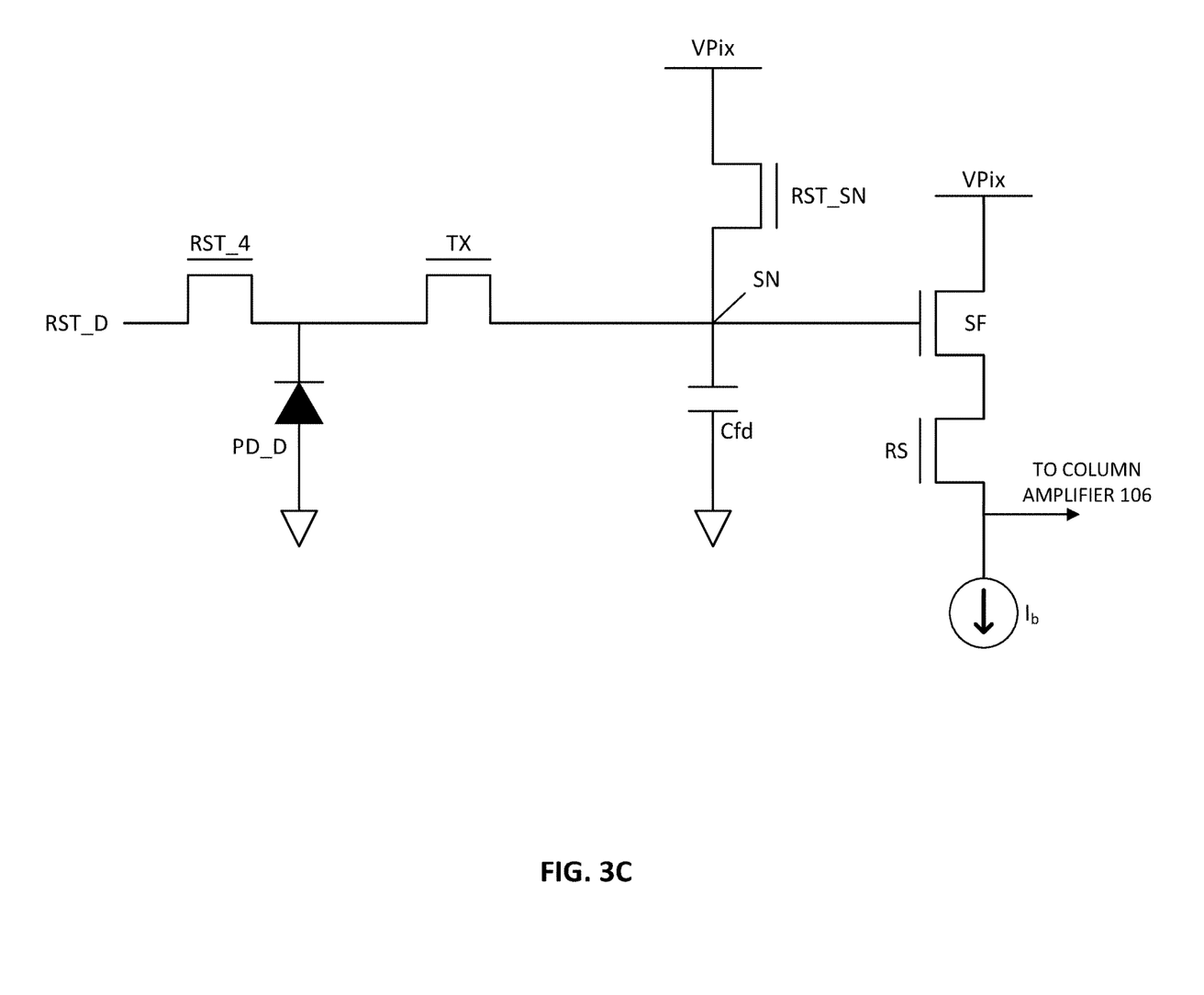
FIG. 3C is a schematic diagram of a last pixel of the group of pixels from FIG. 2, in accordance with an embodiment of the present disclosure.

FIG. 3C illustrates an example circuit schematic of the last pixel (or readout pixel) of the group and the readout circuit, according to an embodiment. In this example, the last pixel of the group is pixel D, and so the output of pixel D is received by a transfer gate TX of the readout circuit. At a given moment in time, at least a portion of the accumulated charge at photodetector PD_D is released onto a sensing node SN via transfer gate TX by turning on transfer gate TX for a predefined number of clock cycles. Once the charge has been released to sensing node SN, it can be stored across capacitor Cfd (or across any number of capacitors). In some examples, capacitor Cfd may have a capacitance of around 1 femtofarad (fF), or between about 0.2 fF and about 3 fF. The conversion gain may be, for example, between about 170 µV/electron and about 200 µV/electron.

The stored accumulated charge potential activates the source follower amplifier SF to produce an output signal to send to column amplifier 106. Source follower amplifier SF may be a single FET device or any other amplifier structure, such as an operational amplifier. According to some embodiments, the pixel readout circuit includes a current source Ib to provide a bias current for operating a source follower amplifier SF. Source follower amplifier SF may be powered, for example, via rail power VPix between about 2 V and about 2.5 V or other suitable rail voltage. The output signal produced from source follower amplifier SF can only be sent on to column amplifier 106 if the row select switch RS is biased on. According to some such examples, all pixels (e.g., all readout pixels) in a given row of pixel array 102 will share a same row select line (e.g., a word line) that couples with the gate of row select switch RS. If row select switch RS is biased off, then the current pixel is part of a row that is not currently being read from and no signal will be sent on to column amplifier 106 from the current pixel.

According to some embodiments, the potential at sensing node SN can be reset to a baseline or reference value via a reset switch RST_SN. When reset switch RST_SN is biased on, the rail voltage VPix is applied to whichever nodes are coupled to the end of reset switch RST_SN (such as at least sensing node SN).

Figure 4:
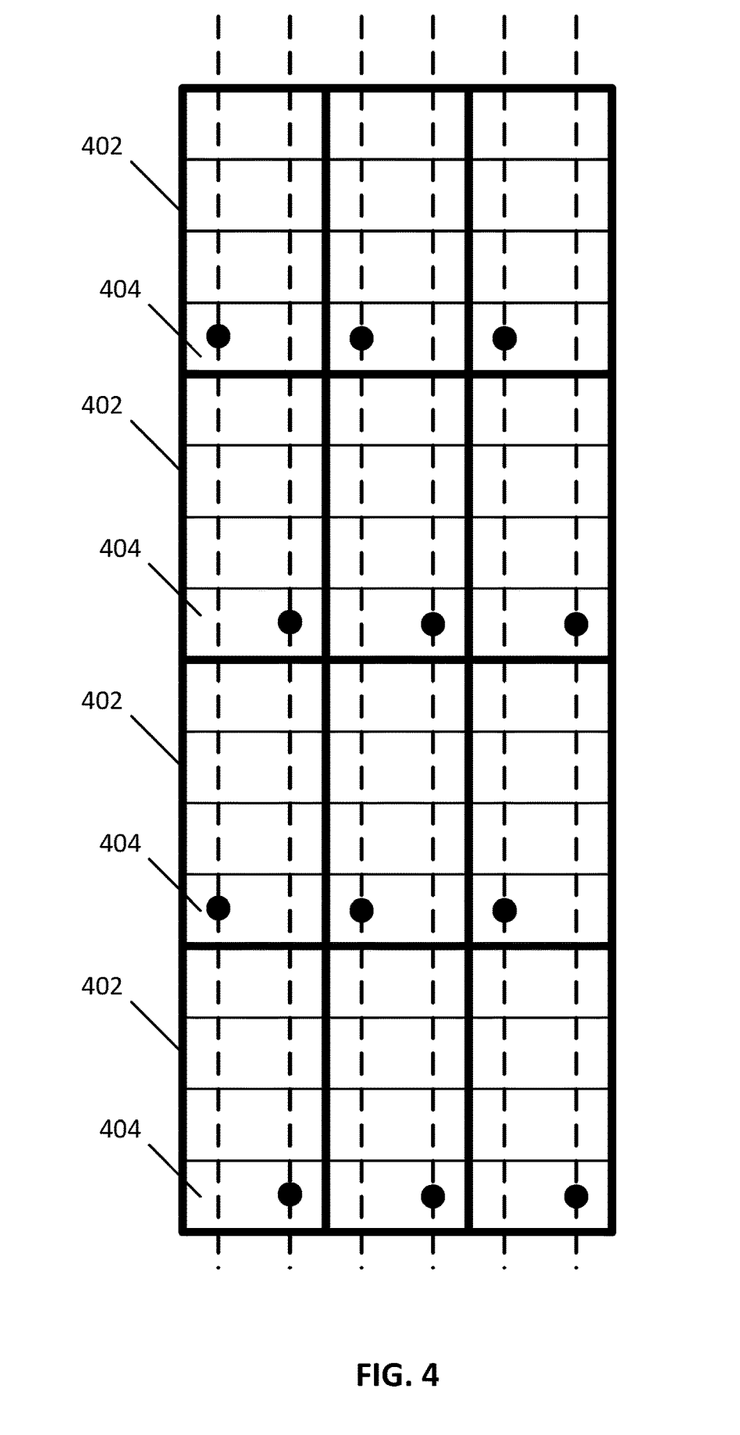
FIG. 4 illustrates an example layout of pixels in a pixel array, in accordance with an embodiment of the present disclosure.

FIG. 4 illustrates an example layout of pixels in a pixel array, according to some embodiments. A pixel group 402 includes any number of individual pixels coupled together in a series arrangement such that the charge from each of the pixels within pixel group 402 is accumulated at a readout pixel 404. In the illustrated example, a given pixel group 402 includes four pixels with one of the four pixels being readout pixel 404, and the pixel groups 402 are arranged along columns within the pixel array. Each column of pixels may be read out in parallel with different column amplifiers as discussed above in FIG. 1.

In the illustrated pixel array, the vertical dashed lines represent conductive traces that make electrical connections to readout pixels 404. Each conductive trace may be coupled to a readout circuit for reading the photodetector charge from a given pixel group 402. According to some embodiments, a given conductive trace may connect with more than one readout pixel 404 in a given column. In the illustrated embodiment, each conductive trace is connected to two readout pixels 404 across two different pixel groups 402. This arrangement allows for more than one conductive trace to be used in a given column of pixels, which allows for parallel readout from more than one readout pixel 404 in the same column, according to some embodiments. As explained above, the pixel array may include any number of rows and columns of pixels, with each column having any number of pixel groups and each pixel group including any number of two or more pixels. In the illustrated embodiment where four pixel groups are included in any given column, a maximum number of four conductive traces may be used in a given column to read out from the various pixel groups in parallel.

Timing Diagrams for Various Operation Modes

Figure 5:
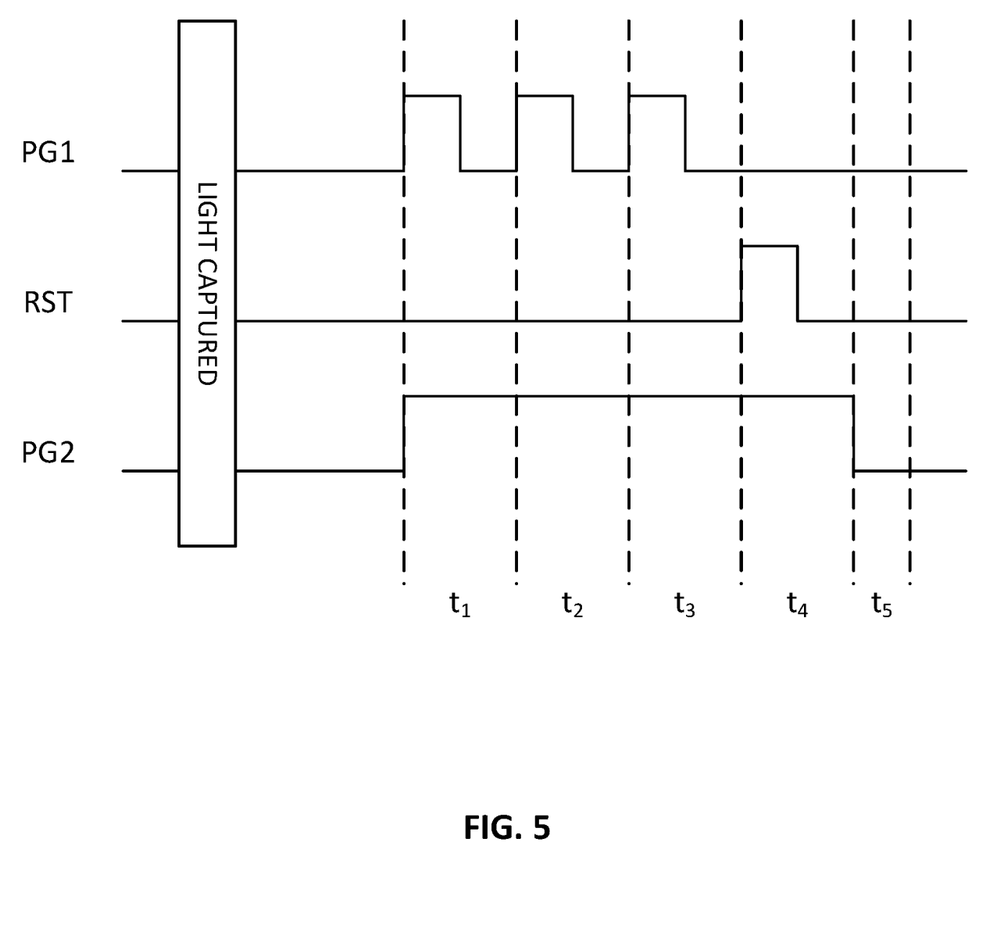
FIG. 5 is a timing diagram for various signals that control certain elements present between any two pixels of a group of pixels (such as shown in FIGS. 3A-3C) to facilitate a charge transfer between the pixels, in accordance with an embodiment of the present disclosure.
Figure 6:
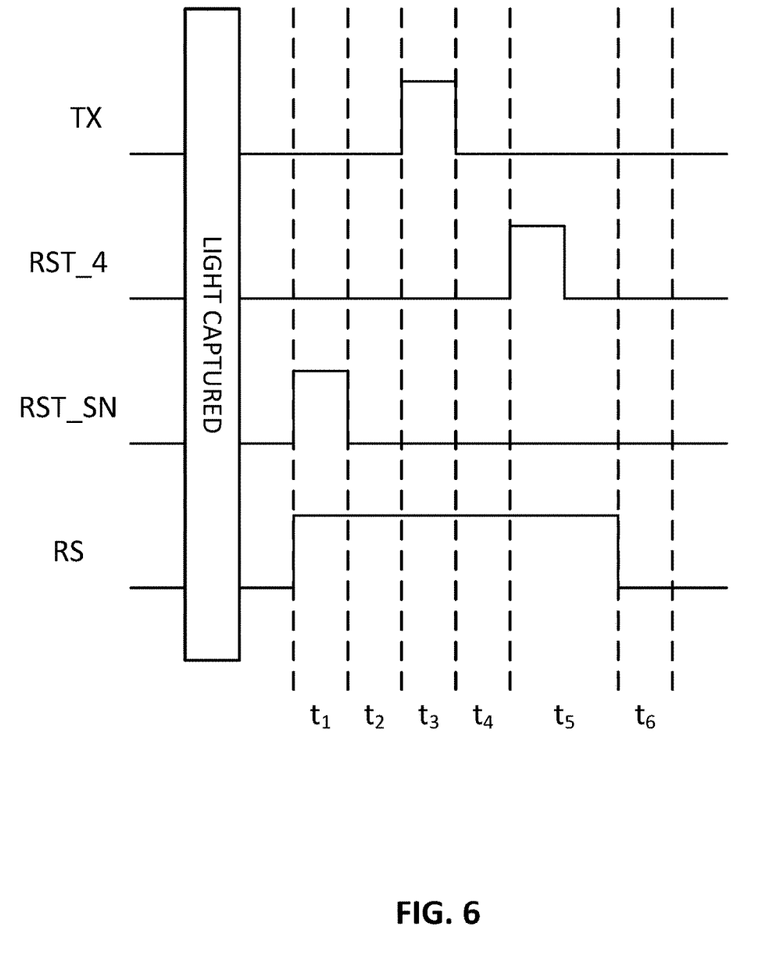
FIG. 6 is a timing diagram for various signals that control certain elements of a readout circuit (such as shown in FIG. 3C), in accordance with an embodiment of the present disclosure.

FIGS. 5 and 6 each provide an example timing diagram for different operations of the pixel circuits and pixel readout circuit. FIG. 5 provides an example timing diagram for the various control signals during charge transfer between two pixels of a given pixel group. FIG. 6 provides an example timing diagram for the various control signals during readout of the accumulated charge from the readout pixel. It should be noted that for the timing diagram of FIG. 5, PG1 and PG2 represent control signals for any given pump gate group between two pixels and thus can represent any of the pairs PG1_A and PG2_A, PG1_B and PG2_B, or PG1_C and PG2_C as shown in FIGS. 3A and 3B. Furthermore, RST represents the corresponding reset switch coupled to the photodetector that is receiving the transferred charge (e.g., received from the second charge gate PG2). As such, the charge transfer timing illustrated in FIG. 5 occurs simultaneously between each adjacently coupled pair of pixels of the pixel group, according to some embodiments.

Turning to FIG. 5, after light has been captured by a first photodetector, a first charge pump operation is performed at first time period $t_1$ to transfer at least some of the first photodetector charge from a first charge gate PG1 to a second charge gate PG2. More specifically, second charge gate PG2 is biased on and remains on while first charge gate PG1 is biased on and then off to transfer some charge between itself and second charge gate PG2 where the charge remains for as long as second charge gate PG2 is biased on. At a second time period $t_2$, another charge pump operation is performed to transfer additional charge to be stored beneath second charge gate PG2. At a third time period $t_3$, another charge pump operation is performed to transfer additional charge to be stored beneath second charge gate PG2. Any number of sequential charge pump operations may be performed in this way to continue to accumulate charge beneath second charge gate PG2.

Before releasing the stored charge onto the next photodetector (e.g., a second photodetector), the reset switch RST coupled to the second photodetector is biased on at a fourth time period $t_4$ to pre-charge the second photodetector with a baseline value to reduce or eliminate the chance of saturating the second photodetector. Reset switch RST may be biased on only for as long it takes to bias the potential at the second photodetector. For example, reset switch RST may be biased on for only a single clock cycle, or only a few clock cycles, before being biased back off during fourth time period $t_4$. According to some embodiments, second charge gate PG2 is biased off at a fifth time period $t_5$, which transfers the accumulated charge beneath second charge gate PG2 onto the second photodetector. As noted above, this process occurs simultaneously between each coupled photodetector pair in the pixel group, such that a final pixel of the pixel group (e.g., the readout pixel) receives the accumulated charge from each of the other pixels in the pixel group.

FIG. 6 provides a timing diagram for reading out the accumulated charge from the readout pixel using the readout circuit of FIG. 3C, according to an embodiment. Following the capture of light, at a first time period $t_1$, the sensing node SN within the readout circuit is reset to a baseline potential by biasing on the reset switch RSN_SN. At this time, row select RS may also be biased on to allow for the charge at sensing node SN to be read out as a photocurrent. Accordingly, row select RS continues to be biased on at a second time period $t_2$ and a baseline reading is captured of the potential at sending node SN. At a third time period $t_3$, the accumulated photodetector charge at the readout pixel is released onto sensing node SN by biasing on TX. At a fourth time period $t_4$, TX is biased off and a reading is captured of the charge stored across capacitor Cfd from sensing node SN. Since only capacitor Cfd is used, this reading may have a relatively high conversion gain. At a fifth time period $t_5$, reset switch RST_4 is biased on to pre-charge the photodetector of the readout pixel (e.g., photodetector PD_D of FIG. 3C) with a baseline value to reduce or eliminate the chance of saturating the photodetector during the next charge integration period. Reset switch RST_4 may be biased on only for as long it takes to bias the potential at the photodetector. For example, reset switch RST_4 may be biased on for only a single clock cycle, or only a few clock cycles, before being biased back off during fifth time period $t_5$. At a sixth time period $t_6$, row select RS is biased off to prevent any further reads occurring from this pixel group (at least until row select RS is biased on again).

According to some embodiments, the baseline readings are compared to the signal readings to capture the difference associated with the amount of light impinging upon the given pixel group. For example, the baseline reading captured at time period $t_2$ is compared to the signal reading captured at time period $t_4$.

Example Computing Platform

Figure 7:
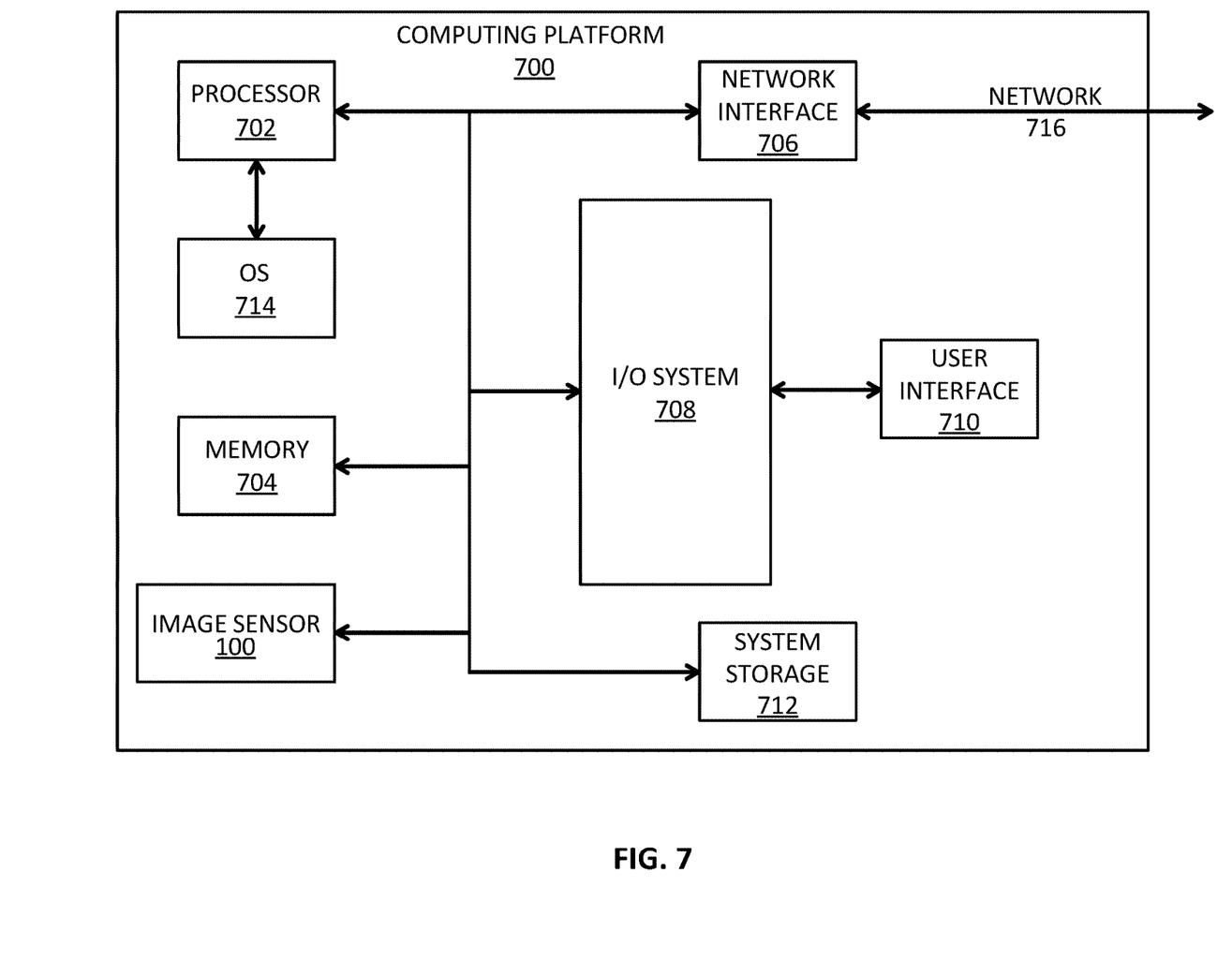
FIG. 7 illustrates an example computing platform that includes the image sensor of FIG. 1, in accordance with an embodiment of the present disclosure.

FIG. 7 illustrates an example computing platform 700 that interfaces with image sensor 100, configured in accordance with certain embodiments of the present disclosure. In some embodiments, computing platform 700 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. Computing platform 700 may host a controlled area network (CAN) used on board a vehicle. In some embodiments, computing platform 700 represents one system in a network of systems coupled together via a CAN bus.

In some embodiments, computing platform 700 may comprise any combination of a processor 702, a memory 704, image sensor 100, a network interface 706, an input/output (I/O) system 708, a user interface 710, and a storage system 712. In some embodiments, one or more components of image sensor 100 are implemented as part of processor 702. As can be further seen, a bus and/or interconnect is also provided to allow for communication between the various components listed above and/or other components not shown. Computing platform 700 can be coupled to a network 716 through network interface 706 to allow for communications with other computing devices, platforms, or resources. Other componentry and functionality not reflected in the block diagram of FIG. 7 will be apparent in light of this disclosure, and it will be appreciated that other embodiments are not limited to any particular hardware configuration.

Processor 702 can be any suitable processor and may include one or more coprocessors or controllers to assist in control and processing operations associated with computing platform 700. In some embodiments, processor 702 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 704 can be implemented using any suitable type of digital storage including, for example, flash memory and/or random access memory (RAM). In some embodiments, memory 704 may include various layers of memory hierarchy and/or memory caches. Memory 704 may be implemented as a volatile memory device such as, but not limited to, a RAM, dynamic RAM (DRAM), or static RAM (SRAM) device. Storage system 712 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 712 may comprise technology to increase the storage performance enhanced protection for valuable digital media when multiple hard drives are included.

Processor 702 may be configured to execute an Operating System (OS) 714 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with computing platform 700, and therefore may also be implemented using any suitable existing or subsequently-developed platform.

Network interface 706 can be any appropriate network chip or chipset which allows for wired and/or wireless connection between other components of computing platform 700 and/or network 716, thereby enabling computing platform 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 708 may be configured to interface between various I/O devices and other components of computing platform 700. I/O devices may include, but not be limited to, a user interface 710. User interface 710 may include devices (not shown) such as a display element, touchpad, keyboard, mouse, and speaker, etc. I/O system 708 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 702 or any chipset of computing platform 700. In some embodiments, an image captured via image sensor 100 can be displayed upon the display element of user interface 710.

It will be appreciated that in some embodiments, the various components of the computing platform 700 may be combined or integrated in a system-on-a-chip (SoC) architecture. In some embodiments, the components may be hardware components, firmware components, software components or any suitable combination of hardware, firmware or software.

In various embodiments, computing platform 700 may be implemented as a wireless system, a wired system, or a combination of both. When implemented as a wireless system, computing platform 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, GPUs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

FURTHER EXAMPLE EMBODIMENTS

The following examples pertain to further embodiments, from which numerous permutations and configurations will be apparent.

Example 1 is a charge coupled device (CCD) that includes a first pixel comprising a first photodetector, a second pixel comprising a second photodetector, a first pump gate and a second pump gate coupled in series between the first pixel and the second pixel, a transfer gate having an input coupled to the second photodetector of the second pixel, and a capacitor coupled to an output of the transfer gate.

Example 2 includes the CCD of Example 1, wherein the transfer gate is a field effect transistor (FET).

Example 3 includes the CCD of Example 1 or 2, further comprising a reset switch coupled to the output of the transfer gate.

Example 4 includes the CCD of any one of Examples 1-3, wherein the output of the transfer gate is coupled to a gate of a FET.

Example 5 includes the CCD of any one of Examples 1-4, wherein each of the first pump gate and the second pump gate includes a FET and a potential barrier.

Example 6 includes the CCD of Example 5, wherein the potential barrier is a PN diode or a PIN diode.

Example 7 includes the CCD of any one of Examples 1-6, further comprising a reset switch coupled to the first photodetector.

Example 8 includes the CCD of any one of Examples 1-7, further comprising a third pixel comprising a third photodetector and a third pump gate and a fourth pump gate coupled in series between the third pixel and the first pixel.

Example 9 includes the CCD of Example 8, further comprising a first reset switch coupled to the first photodetector, a second reset switch coupled to the second photodetector, and a third reset switch coupled to the third photodetector.

Example 10 is an image sensor that includes a pixel array having at least one column of addressable pixels with at least a first pixel having a first photodetector and a second pixel having a second photodetector, a first pump gate and a second pump gate coupled in series between the first pixel and the second pixel, and a readout circuit including a transfer gate having an input coupled to the second photodetector of the second pixel, and a capacitor coupled to an output of the transfer gate.

Example 11 includes the image sensor of Example 10, further including a column amplifier coupled to the readout circuit, an analog-to-digital converter (ADC) coupled to the column amplifier, and a processor coupled to the ADC.

Example 12 includes the image sensor of Example 10 or 11, wherein the transfer gate is a field effect transistor (FET).

Example 13 includes the image sensor of any one of Examples 1-12, wherein the readout circuit further comprises a reset switch coupled to the output of the transfer gate.

Example 14 includes the image sensor of any one of Examples 1-13, wherein the output of the transfer gate is coupled to a gate of a FET.

Example 15 includes the image sensor of any one of Examples 1-14, wherein each of the first pump gate and the second pump gate includes a FET and a potential barrier.

Example 16 includes the image sensor of Example 15, wherein the potential barrier is a PN diode or a PIN diode.

Example 17 includes the image sensor of any one of Examples 1-16, further comprising a reset switch coupled to the first photodetector.

Example 18 includes the image sensor of any one of Examples 1-17, wherein the pixel array further comprises a third pixel comprising a third photodetector, and the image sensor further comprises a third pump gate and a fourth pump gate coupled in series between the third pixel and the first pixel.

Example 19 includes the image sensor of Example 18, further comprising a first reset switch coupled to the first photodetector, a second reset switch coupled to the second photodetector, and a third reset switch coupled to the third photodetector.

Example 20 is a charge coupled device (CCD) that includes a plurality of pixels each having a photodetector, and a plurality of pump gate blocks with each pump gate block being between a pair of pixels of the plurality of pixels. Each pump gate block includes a first pump gate coupled in series with a second pump gate. The CCD further includes a transfer gate having an input coupled to the photodetector of one pixel of the plurality of pixels, and a capacitor coupled to an output of the transfer gate.

Example 21 includes the CCD of Example 20, wherein the transfer gate is a field effect transistor (FET).

Example 22 includes the CCD of Example 20 or 21, further comprising a reset switch coupled to the output of the transfer gate.

Example 23 includes the CCD of any one of Examples 20-22, wherein the output of the transfer gate is coupled to a gate of a FET.

Example 24 includes the CCD of any one of Examples 20-23, wherein each of the first pump gate and the second pump gate includes a FET and a potential barrier.

Example 25 includes the CCD of Example 24, wherein the potential barrier is a PN diode or a PIN diode.

Example 26 includes the CCD of any one of Examples 20-25, further comprising a plurality of reset switches with each reset switch coupled to a corresponding photodetector of the plurality of pixels.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A charge coupled device (CCD), comprising:
a first pixel comprising a first photodetector;
a second pixel comprising a second photodetector;
a first pump gate and a second pump gate coupled in series between the first pixel and the second pixel;
a transfer gate having an input coupled to the second photodetector of the second pixel; and
a capacitor coupled to an output of the transfer gate.

2. The CCD of claim 1, further comprising a reset switch coupled to the output of the transfer gate.

3. The CCD of claim 1, wherein the output of the transfer gate is coupled to a gate of a FET.

4. The CCD of claim 1, wherein each of the first pump gate and the second pump gate includes a FET and a potential barrier.

5. The CCD of claim 4, wherein the potential barrier is a PN diode or a PIN diode.

6. The CCD of claim 1, further comprising a third pixel comprising a third photodetector and a third pump gate and a fourth pump gate coupled in series between the third pixel and the first pixel.

7. The CCD of claim 6, further comprising a first reset switch coupled to the first photodetector, a second reset switch coupled to the second photodetector, and a third reset switch coupled to the third photodetector.

8. An image sensor, comprising:
a pixel array having at least one column of addressable pixels, wherein the at least one column of addressable pixels includes at least a first pixel having a first photodetector and a second pixel having a second photodetector;
a first pump gate and a second pump gate coupled in series between the first pixel and the second pixel; and a readout circuit including a transfer gate having an input coupled to the second photodetector of the second pixel, and a capacitor coupled to an output of the transfer gate.

9. The image sensor of claim 8, further comprising:
a column amplifier coupled to the readout circuit;
an analog-to-digital converter (ADC) coupled to the column amplifier; and
a processor coupled to the ADC.

10. The image sensor of claim 8, wherein the readout circuit further comprises a reset switch coupled to the output of the transfer gate.

11. The image sensor of claim 8, wherein the output of the transfer gate is coupled to a gate of a FET.

12. The image sensor of claim 8, wherein each of the first pump gate and the second pump gate includes a FET and a potential barrier.

13. The image sensor of claim 12, wherein the potential barrier is a PN diode or a PIN diode.

14. The image sensor of claim 8, wherein the pixel array further comprises a third pixel comprising a third photodetector, and the image sensor further comprises a third pump gate and a fourth pump gate coupled in series between the third pixel and the first pixel.

15. The image sensor of claim 14, further comprising a first reset switch coupled to the first photodetector, a second reset switch coupled to the second photodetector, and a third reset switch coupled to the third photodetector.

16. A charge coupled device (CCD), comprising:
a plurality of pixels each having a photodetector;
a plurality of pump gate blocks, each pump gate block being between a pair of pixels of the plurality of pixels, each pump gate block comprising a first pump gate coupled in series with a second pump gate;
a transfer gate having an input coupled to the photodetector of one pixel of the plurality of pixels; and
a capacitor coupled to an output of the transfer gate.

17. The CCD of claim 16, wherein the output of the transfer gate is coupled to a gate of a FET.

18. The CCD of claim 16, wherein each of the first pump gate and the second pump gate includes a FET and a potential barrier.

19. The CCD of claim 18, wherein the potential barrier is a PN diode or a PIN diode.

20. The CCD of claim 16, further comprising a plurality of reset switches with each reset switch coupled to a corresponding photodetector of the plurality of pixels.

* * * * *